July 14, 1931.  F. J. LAPOINTE  1,814,089
POWER TRANSMISSION MECHANISM
Filed Nov. 5, 1929
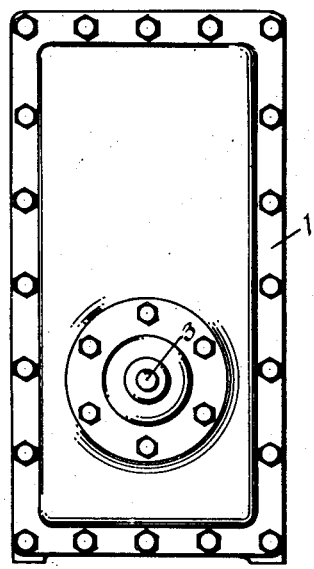
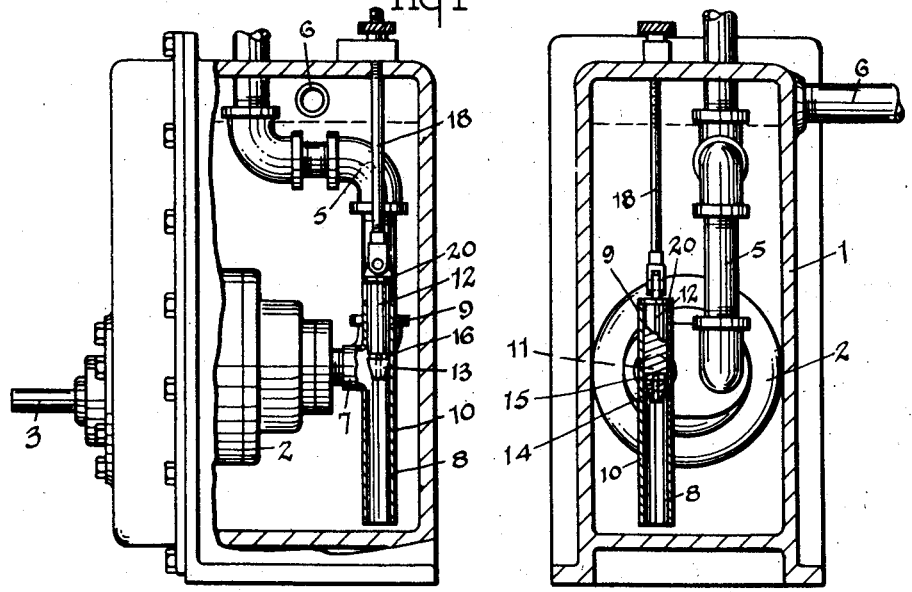
Inventor
Francis J. Lapointe
Attorney Patented July 14, 1931

1,814,089

UNITED STATES PATENT OFFICE

FRANCIS J. LAPOINTE, OF ANN ARBOR, MICHIGAN

POWER TRANSMISSION MECHANISM

Application filed November 5, 1929. Serial No. 405,025.

My invention has for its object to provide an efficient speed control device for power transmission mechanisms, such as oil pumps. The invention enables an efficient control of the speed by regulating the flow of the liquid at the intake of a pump and it finds its greatest advantage in connection with a submerged pump wherein all the air is entirely eliminated from the liquid and from within the pump. Thus, the invention involves also the use of a control means for the inflow or inlet of a submerged oil pump.

The invention may be contained in structures of different forms and, to illustrate a practical application of the invention, I have selected an oil pump control device as an example of the various embodiments of my invention, and shall describe the device selected hereinafter. The power transmission device referred to is shown in the accompanying drawings.

Fig. 1 illustrates an end view of the power transmission device. Fig. 2 is a view of a section showing the control mechanism for regulating the transmission of power through the pump. Fig. 3 is a view of a section taken on a plane at right angles to the section shown in Fig. 2.

The power transmission device has a shell 1, in which a pump 2 is located. The pump 2 is preferably located near the lower end of the shell, and the shell has dimensions so that it may be filled with oil to completely submerge the pump. The shell 1 forms a reservoir for the oil used for transmission of pressure from the pump to any device operated by the pump. A shaft 3 is driven by any suitable power to cause rotation of the movable parts of the pump. The particular pump shown in the drawing is a gear pump which transmits pressure hydraulically through the medium of the oil with which the shell 1, and the parts that are connected to the shell, are filled.

A pipe 5 is connected to the outlet of the pump and conveys the oil under pressure to a suitable power transforming mechanism, such as a piston and cylinder or a rotary driven mechanism, in the manner well known in the art. A return pipe 6 is connected to the shell to return the oil from such driven mechanism to the pump 2.

A short tubular member 10 is located in the shell 1 below the level of the oil and extends to the bottom of the shell 1 and its interior communicates with the inlet port 11 of the pump. The tubular member 10 is made in the form of a T having the parts 7, 8, and 9. The tubular member is connected with the inlet port 11 of the pump 2 by the shank or part 7 of the T. The top of the T extends vertically, one end portion terminating at the bottom of the shell 1 and the other end portion extending a short distance above the part 7. A plunger 12 is slidably movable in the part 9. The plunger may be operated by any suitable means, such as the rod 18, for the purpose of shifting the plunger in the upper end portion of the tubular member 10. The lower end of the plunger 12 is formed to have a truncated conical part 13 which operates to progressively reduce the effective cross sectional area of the passageway formed within the tubular member to the inlet port 11 of the pump as the plunger 12 is moved downward within the tubular member 10 and across the inlet port 11 of the pump.

In order to prevent the pump from running dry, the parts are formed to have a restricted passageway which will admit the oil from the lower end of the tubular member 10 in small quantities, while the pump is being operated by the shaft 3. In the form of construction shown, a hole 14 is bored axially from the lower end of the plunger 12 to a point near the base of the conical part 13 and a transversely extending hole 15 is bored through the plunger so as to establish a communication through the central hole 14 and to a point on the side of the plunger. A groove 16 is cut at the base of the conical end portion 13 at a point such that it will form a passageway around the plunger 12 and between the plunger 12 and the inner surface of the tubular member 10. Consequently, when the base portion of the cone 13 closes the upper end of the lower part 8 of the T, the groove 16 will be in communication with the passageway extending through the shank or part 7 of the T, and with the inlet of the pump 2. Thus, when the pump is driven by the operation of the shaft 3, oil will be drawn from the bottom of the shell through the restricted passageway formed by the small openings 14 and 15 and the groove 16, and will be drawn into the pump at a very slow rate but at a rate sufficient to maintain the lubrication of the pump.

The groove 16 may be located at any point along the plunger that is positioned in front of the inlet 11 of the pump 2 when the plunger 12 substantially closes the passageway through the tubular member 10, provided the openings 14 and 15 communicate with the groove 16. Preferably, the channel 16 is located at such a point that it will be opposite the opening 11 when the passageway through the tubular member 10 is closed except for the restricted passageway formed through the holes 14 and 15. In order to limit the plunger in its closing movements, it may be provided with the flange 20 that engages the upper end of the part 9 of the tubular member at the completion of the downward movement of the plunger 12 and so as to locate the groove 16 opposite the inlet 11 and above the lower surface of the part 7 of the T.

I claim:

1. In a power transmission mechanism, a shell for containing an oil pump and oil, the pump having a rotatable member, the pump located within the shell at a point sufficiently below the upper end of the shell to locate the entire interior of the pump below the level of the oil in the shell, a member also located below the level of the oil and having a passageway communicating with the inlet port of the pump and with the lower end of the shell, and a movable member located in the passageway for progressively reducing the effective area thereof, the movable member having a restricted by-pass for maintaining the flow of oil from the lower end of the shell to the inlet port of the pump when the passageway is substantially closed by the member.

2. In a power transmission mechanism, a shell for containing an oil pump and oil, the pump having a rotatable member, the pump located within the shell at a point sufficiently below the upper end thereof to locate the entire interior of the pump below the level of the oil in the shell, a member located below the level of oil and having a passageway communicating with the inlet port of the pump and with the lower end of the shell, a plunger having a tapered end and fitting the passageway substantially at the point of its communication with the pump to progressively reduce the effective area of the passageway as the tapered end is moved therein, the plunger having a groove located substantially at the larger end of the tapered portion of the plunger and communicating with the inlet port when the plunger is located in its substantially closed position, the plunger having a restricted by-pass extending from the end of the plunger to the groove for maintaining a flow of oil from the lower end of the shell to the inlet of the pump while the pump is in operation and the passageway is substantially closed.

In witness whereof I have hereunto signed my name to this specification.

FRANCIS J. LAPOINTE.